(12) United States Patent  
Luo et al.

(10) Patent No.: US 11,661,990 B2
(45) Date of Patent: May 30, 2023

(54) FORMATION METHOD FOR LIQUID RUBBER COMPOSITE NODES WITH TUBULAR FLOW CHANNEL

(71) Applicant: ZHUZHOU TIMES RUIWEI ANTI-VIBERATION EQUIPMENT LIMITED, Hunan (CN)

(72) Inventors: Jun Luo, Hunan (CN); Wensong Liu, Hunan (CN); Sheng Lin, Hunan (CN); Zhongsan Jiang, Hunan (CN); Junhui Chen, Hunan (CN); Yuxiang Zhang, Hunan (CN); Xianhui Zeng, Hunan (CN); Jing Li, Hunan (CN); Juan Zhou, Hunan (CN)

(73) Assignee: ZHUZHOU TIMES RUIWEI ANTI-VIBERATION EQUIPMENT LIMITED, Hunan (CN)

( * ) Notice: Subject to any disclaimer, the term of this patent is extended or adjusted under 35 U.S.C. 154(b) by 0 days.

(21) Appl. No.: 17/604,446

(22) PCT Filed: Aug. 18, 2020

(86) PCT No.: PCT/CN2020/109803
§ 371 (c)(1),
(2) Date: Oct. 18, 2021

(87) PCT Pub. No.: WO2021/036866
PCT Pub. Date: Mar. 4, 2021

(65) Prior Publication Data
US 2022/0196102 A1 Jun. 23, 2022

(30) Foreign Application Priority Data
Aug. 30, 2019 (CN) .......................... 201910815522.X

(51) Int. Cl.
*F16F 13/14* (2006.01)
*F16F 5/00* (2006.01)
*F16F 15/023* (2006.01)

(52) U.S. Cl.
CPC ............ *F16F 5/00* (2013.01); *F16F 13/1445* (2013.01); *F16F 13/1463* (2013.01);
(Continued)

(58) Field of Classification Search
CPC .......... F16F 5/00; F16F 13/14; F16F 13/1445; F16F 13/1463; F16F 15/023;
(Continued)

(56) References Cited

U.S. PATENT DOCUMENTS 4,588,174 A * 5/1986 Konishi .................. F16F 13/14
267/141.2
4,605,207 A * 8/1986 Konishi .............. F16F 13/1409
267/281
(Continued)

FOREIGN PATENT DOCUMENTS

| CN | 1626844 | 6/2005 |
|---|---|---|
| CN | 102644693 | 8/2012 |

(Continued)

OTHER PUBLICATIONS

Machine translation JP 2005-282780 A. (Year: 2005).*
(Continued)

*Primary Examiner* — Thomas J Williams
(74) *Attorney, Agent, or Firm* — JCIP Global Inc.

(57) ABSTRACT

A formation method for liquid rubber composite nodes with a tubular flow channel is provided. The formation method includes adding a middle spacer sleeve between an outer sleeve and a mandrel, bonding the middle spacer sleeve and the mandrel together through rubber vulcanization and assembling the integrated middle spacer sleeve and the (Continued)

mandrel into the outer sleeve; installing a tubular flow channel in the mandrel; hollowing the middle spacer sleeve to form a plurality of spaces; after vulcanization, forming a plurality of interdependent liquid cavities by using rubber and the plurality of spaces; and arranging liquid in the plurality of liquid cavities and communicating the plurality of liquid cavities through the tubular flow channel.

15 Claims, 13 Drawing Sheets

(52) U.S. Cl.
CPC ...... *F16F 15/023* (2013.01); *F16F 2224/048* (2013.01); *F16F 2232/08* (2013.01); *F16F 2238/02* (2013.01); *F16F 2238/04* (2013.01)

(58) Field of Classification Search
CPC ............ F16F 15/027; F16F 15/0275; F16F 2224/048; F16F 2232/08; F16F 2238/02; F16F 2238/04; B60K 5/12; B60K 5/1208; B60K 5/1291
USPC ..................................................... 267/140.12
See application file for complete search history.

(56) References Cited

U.S. PATENT DOCUMENTS

| | | | | | |
|---|---|---|---|---|---|
| 4,717,111 | A | * | 1/1988 | Saito | F16F 13/1409 248/659 |
| 4,728,086 | A | * | 3/1988 | Ishiyama | F16F 13/20 267/141.2 |
| 4,749,174 | A | * | 6/1988 | Kanda | F16F 13/14 180/312 |
| 4,753,421 | A | * | 6/1988 | Makibayashi | F16F 13/24 180/312 |
| 4,763,884 | A | * | 8/1988 | Matsui | F16F 13/14 267/121 |
| 4,795,140 | A | * | 1/1989 | Orikawa | F16F 13/24 267/140.3 |
| 4,861,004 | A | * | 8/1989 | Yokota | F16F 13/1409 267/293 |
| 4,861,005 | A | * | 8/1989 | Bausch | F16F 13/28 267/140.12 |
| 4,869,475 | A | * | 9/1989 | Bouhier | F16F 13/1427 267/219 |
| 4,919,401 | A | * | 4/1990 | Yano | F16F 13/14 267/140.2 |
| 4,974,819 | A | * | 12/1990 | Reichard | F16F 13/14 188/312 |
| 5,096,166 | A | * | 3/1992 | Schwerdt | F16F 1/387 267/140.3 |
| 2022/0196102 | A1 | * | 6/2022 | Luo | F16F 5/00 |
| 2022/0196108 | A1 | * | 6/2022 | Luo | F16F 13/1463 |

FOREIGN PATENT DOCUMENTS

| | | |
|---|---|---|
| CN | 204845947 | 12/2015 |
| CN | 105501242 | 4/2016 |
| CN | 108999884 | 12/2018 |
| CN | 109455191 | 3/2019 |
| CN | 110388401 | 10/2019 |
| CN | 110486413 | 11/2019 |
| CN | 110500377 | 11/2019 |
| CN | 210889875 | 6/2020 |
| DE | 3833451 | 12/1989 |
| JP | S6217440 | 1/1987 |
| JP | 2003097630 | 4/2003 |
| JP | 2005282780 | 10/2005 |
| JP | 2015055263 | 3/2015 |

OTHER PUBLICATIONS

"International Search Report (Form PCT/ISA/210) of PCT/CN2020/109803," dated Nov. 12, 2020, with English translation thereof, pp. 1-6.

* cited by examiner

US 11,661,990 B2

FORMATION METHOD FOR LIQUID RUBBER COMPOSITE NODES WITH TUBULAR FLOW CHANNEL

CROSS-REFERENCE TO RELATED APPLICATION

This application is a 371 of international application of PCT application serial no. PCT/CN2020/109803, filed on Aug. 18, 2020, which claims the priority benefit of China application no. 201910815522.X, filed on Aug. 30, 2019. The entirety of each of the above mentioned patent applications is hereby incorporated by reference herein and made a part of this specification.

TECHNICAL FIELD

The present invention relates to a formation method for liquid rubber composite nodes, in particular to a formation method for liquid rubber composite nodes with a tubular flow channel.

DESCRIPTION OF RELATED ART

According to the dynamic requirements, a tumbler node provides large radial stiffness to ensure the operational stability and improve the critical speed during linear high-speed operation (high frequency vibration) and provides small stiffness performance to ensure curve passing performance and reduce wear when passing a curve (low frequency and large amplitude). It is difficult for an ordinary node to realize the above characteristics; especially for old lines, wheel rails and lines are worn seriously and need high maintenance cost. Therefore, it is necessary to use a new product having the above characteristics, i.e., a liquid rubber composite node.

Working principle of a liquid rubber composite tumbler node: two hollow cavity structures are mainly designed in a rubber component, two cavities are communicated through a flow channel design and sealed incompressible (viscous) liquid is injected in advance in a cavity. Under the action of load, the volumes in the two cavities are changed and the liquid flows between the two cavities to generate damping to consume vibration energy to achieve the purpose of attenuating vibration. During low frequency vibration, the liquid flows up and down through a channel to achieve a large damping effect; the liquid in a high frequency section cannot flow; a damping value is small and the vibration is effectively isolated; and during high frequency vibration, dynamic stiffness is basically stable and unchanged, thereby achieving the function of preventing dynamic hardening. The frequency ratio of the system is basically unchanged and a good vibration reduction effect still can be achieved.

After retrieval, the relevant domestic patent documents are found as follows:

1. Chinese patent publication of CN102644693A, dated Aug. 22, 2012, discloses a method for regulating the dynamic stiffness of rubber joints with liquid damping. More than two closed cavities are arranged in the rubber joints; the closed cavities are mutually communicated through a throttling passage; and an adjusting device for controlling the flowing area of the throttling passage is arranged on the throttling passage and is used to adjust the size of the throttling passage to adjust the size of the damping force to obtain required dynamic stiffness of the rubber joints.

2. Chinese patent publication of CN105501242A, dated Apr. 20, 2016, discloses a rubber node which comprises: a mandrel, an outer sleeve and a rubber layer. The rubber layer is filled between the mandrel and the outer sleeve; the rubber layer is provided with a first cavity and a second cavity on two symmetrical sides of the mandrel; a first communication passage for connecting the first cavity and the second cavity is arranged in the rubber node; and liquid is filled in the first cavity and the second cavity and the first cavity and the second cavity are not full of the liquid.

3. Chinese patent publication of CN204845947U, dated Dec. 9, 2015, discloses an axle box node which comprises a mandrel, an elastic sleeve and a housing. The middle part of the mandrel is provided with a through hole penetrating the mandrel; the elastic sleeve is sleeved on the outer wall of the spindle; the elastic sleeve is provided with a first cavity and a second cavity; the bottom of the first cavity and the bottom of the second cavity are respectively communicated with both ends of the through hole to form a cavity body; liquid is arranged in the cavity body; and the housing is sleeved outside the elastic sleeve.

4. Chinese patent publication of CN109455191A, dated Mar. 12, 2019, discloses a variable stiffness tumbler node. The tumbler node comprises an outer sleeve, a main spring, an auxiliary spring and a mandrel; the surface of the mandrel is wound with an oil liquid pipeline; the main spring is vulcanized into a whole by two parts of rubber and metal; the metal part of the main spring is pressed together with the mandrel; both ends of the main spring are pressed with auxiliary spring; the auxiliary spring is also vulcanized into a whole by two parts of rubber and metal corresponding to the main spring; the outer sleeve is pressed at the periphery of the main spring and the auxiliary spring; two oil cavities are arranged between the outer sleeve and the main spring by taking the mandrel as a symmetric axis; and the two oil cavities are respectively communicated with two ports of the corresponding oil liquid pipeline.

To further optimize the performance of the liquid rubber composite nodes, the product needs to provide large axial stiffness and realize large dynamic-static ratio so that the existing liquid rubber composite node in the above patent document is difficult to be realized.

In conclusion, it is urgent to design a novel formation method for liquid rubber composite nodes, so as to provide small radial stiffness and large axial stiffness to realize a large dynamic-static ratio, thereby optimizing the product performance of the liquid rubber composite nodes.

SUMMARY

The technical problem to be solved in the present invention is to provide a formation method for liquid rubber composite nodes with a tubular flow channel with respect to the defects in the prior art, which can provide small radial stiffness and large axial stiffness to realize a large dynamic-static ratio, thereby optimizing the product performance of the liquid rubber composite nodes.

To solve the above technical problems, the present invention adopts the technical solution. A formation method for liquid rubber composite nodes with a tubular flow channel includes adding a middle spacer sleeve between an outer sleeve and a mandrel, bonding the middle spacer sleeve and the mandrel together through rubber vulcanization and assembling the integrated middle spacer sleeve and the mandrel into the outer sleeve; installing a tubular flow channel in the mandrel; hollowing the middle spacer sleeve to form a plurality of spaces; after vulcanization, forming a plurality of interdependent liquid cavities by using rubber and the plurality of spaces; and arranging liquid in the plurality of liquid cavities and communicating the plurality of liquid cavities through the tubular flow channel.

Preferably, the formation method of the tubular flow channel is as follows: the mandrel is arranged into an inner part and an outer part; the inner part is a mandrel body, and the outer part is a mandrel outer sleeve; the mandrel body is assembled into the mandrel outer sleeve; flow channel grooves are arranged on an outer circumferential surface of the mandrel body; the flow channel grooves are distributed around the outer circumferential surface of the mandrel body; a pipe body is arranged in each flow channel groove along the length direction of the flow channel groove; and both ends of the pipe body are respectively communicated with the plurality of liquid cavities.

Preferably, the flow channel grooves are arranged in a first arrangement mode or a second arrangement mode.

The first arrangement mode is: the flow channel grooves are directly arranged on the outer circumferential surface of the mandrel body; then the pipe bodies are placed in the flow channel grooves; the mandrel body is assembled into the mandrel outer sleeve; after assembly, the inner circumferential surface of the mandrel outer sleeve is in direct contact with the pipe bodies; and the pipe bodies are pressed in the flow channel grooves.

The second arrangement mode is: groove regions are arranged on the outer circumferential surface of the mandrel body; then the flow channel grooves are arranged on bottom surfaces of the groove regions; the pipe bodies are placed in the flow channel grooves; pressing sleeves are arranged in the groove regions; and the pipe bodies are pressed in the flow channel grooves by the pressing sleeves.

Preferably, the specific formation method of the liquid cavities is as follows: firstly, the plurality of spaces are dug out on the middle spacer sleeve; the spaces are similar to through holes, and outer ends and inner ends of the spaces are open; when openings at the inner ends of the spaces are sealed, the openings at the inner ends of the spaces are blocked by the vulcanized rubber after the mandrel and the middle spacer sleeve are bonded together through rubber vulcanization; when openings at the outer ends of the spaces are sealed, an arc cover plate is covered on the hollowed middle spacer sleeve and used for blocking the openings at the outer ends of the spaces; and by using the method, the plurality of spaces form the plurality of liquid cavities.

Preferably, a bump protruding towards the mandrel is arranged on an inner circumferential arc surface of the arc cover plate; the bump comes into contact with the rubber to provide nonlinear stiffness, and the bump comes into contact with the mandrel to form hard stop limiting.

Preferably, the middle spacer sleeve adopts an integral spacer sleeve or a multi-disc spacer sleeve; two liquid cavities are arranged; and the two liquid cavities are symmetrically distributed on the middle spacer sleeve about an axis of the middle spacer sleeve.

Preferably, when the middle spacer sleeve adopts the multi-disc spacer sleeve, before assembly, a gap E is reserved between end surfaces of two close ends of adjacent disc bodies; and after assembly, the gap E disappears and the end surfaces of two close ends of adjacent disc bodies come into contact with each other. Before assembly, an open gap F is also reserved in the rubber and at each gap E; and after assembly, the open gap F is filled with deformed rubber, so that the open gap F disappears.

Preferably, when the middle spacer sleeve adopts the multi-disc spacer sleeve, non-equal design is adopted, i.e., by taking a center point of the middle spacer sleeve as a circle point, circle center angles corresponding to a plurality of arc disc bodies are unequal; and the circle center angles corresponding to hollowed arc disc bodies are larger than circle center angles corresponding to non-hollowed arc valve bodies.

Preferably, the mandrel outer sleeve is formed by the following method: the mandrel outer sleeve is formed by taking a central axis I of the mandrel outer sleeve as a bus and taking a saddle surface J, which is high at both ends and low in a middle, as a rotating surface;

the rubber between the mandrel outer sleeve and the middle spacer sleeve is divided into two parts; one part of the rubber is middle rubber, and the other part of the rubber is end rubber located at both ends of the middle rubber; a thickness of the middle rubber along a radial direction of the mandrel is set as radial thickness H1, and a thickness of the end rubber along the axial direction of the mandrel is set as axial thickness H2;

the radial thickness H1 and the axial thickness H2 are adjusted to adjust a radial stiffness and the axial stiffness of the nodes.

Preferably, when the openings at the outer ends of the spaces are sealed, a step part is arranged on the middle spacer sleeve, a complete ring of the step part is arranged along the openings at the outer ends of the spaces, and the arc cover plate is covered on the step part.

Preferably, the step part is a one-level step; during assembly, the rubber is coated on the step part and the arc cover plate is covered on the step part so that the arc cover plate is in contact with the rubber coating on the step part.

Preferably, the step part is a multi-level step comprising a one-level outer spacer sleeve step part and a multi-level inner spacer sleeve step part; during assembly, the rubber is coated on the multi-level inner spacer sleeve step part and the arc cover plate is covered on the step part so that the arc cover plate is connected in interference fit with the first-level outer spacer sleeve step part, and the arc cover plate is connected to the multi-level inner spacer sleeve step part in a rubber over-pressure fit mode.

Preferably, the step part is a second-level step and is provided with a first spacer sleeve step part and a second spacer sleeve step part. The first spacer sleeve step part is the outer spacer sleeve step part; the second spacer sleeve step part is the inner spacer sleeve step part; the rubber is coated up to the second spacer sleeve step part; the arc cover plate in contact with the step part is correspondingly arranged into a multi-stage step shape. The arc cover plate includes a first cover plate step part and a second cover plate step part. During assembly, when the arc cover plate is covered on the step part, the first cover plate step part is connected in interference fit with the first spacer sleeve step part, and the second cover plate step part is connected to the second spacer sleeve step part in the rubber over-pressure fit mode.

Preferably, a rubber groove is arranged on the first spacer sleeve step part; before assembly, solid gum is applied in the rubber groove; and during assembly, when the first cover plate step part and the first spacer sleeve step part are connected in interference fit, the solid gum is also in contact with the first cover plate step part.

Preferably, a sealing groove is formed on the first spacer sleeve step part; before assembly, a sealing ring is assembled in the sealing groove; and during assembly, when the first cover plate step part and the first spacer sleeve step part are connected in interference fit.

Preferably, a cover plate sealing groove is formed on the second cover plate step part; when the rubber is coated on the second spacer sleeve step part, a sealing bulge is formed on the rubber; and during assembly, when the second cover plate step part is connected with the second spacer sleeve step part in the rubber over-pressure fit mode, the sealing bulge is positioned in the cover plate sealing groove and is extruded and contacted by the cover plate sealing groove.

Preferably, a rubber groove is arranged on the first spacer sleeve step part; before assembly, solid gum is applied in the rubber groove; and during assembly, when the first cover plate step part and the first spacer sleeve step part are connected in interference fit, the solid gum is also in contact with the first cover plate step part.

Preferably, a sealing groove is formed on the first spacer sleeve step part. Before assembly, a sealing ring is assembled in the sealing groove; and during assembly, when the first cover plate step part and the first spacer sleeve step part are connected in interference fit, the sealing ring is tightly pressed in the sealing groove by the first cover plate step part.

The present invention has the beneficial effects that: the present invention forms a plurality of independent liquid cavities capable of storing liquid by hollowing and vulcanizing the rubber on the middle spacer sleeve, then installs the tubular flow channel on the mandrel, and communicates the plurality of liquid cavities by the tubular flow channel to form liquid rubber composite nodes, so as to provide small radial stiffness and large axial stiffness to realize a large dynamic-static ratio, thereby optimizing the product performance of the liquid rubber composite nodes. The pipe bodies are used for guiding the liquid so that the liquid can only flow along the length direction of the pipe bodies without transverse flow, so as to further enhance the reliability of the product. The formation method of the flow channel of the pipe bodies is designed to facilitate the assembly of the product. Through the design of the specific formation method of the liquid cavities, the liquid cavities can be formed smoothly and the quality of the product is guaranteed. When the middle spacer sleeve is designed into a multi-disc spacer sleeve, the assembly structure and the process thereof are designed so as to ensure that after the interference assembly is completed, direct contact is made between the end surfaces of the two adjacent ends of the adjacent disc bodies without rubber interference, which can further improve the performance of the assembled product. When the middle spacer sleeve is designed into a multi-disc spacer sleeve, the non-equal design is adopted for the middle spacer sleeve, and the volume space of the liquid cavities is enlarged as much as possible. The rubber in the middle of the middle spacer sleeve is divided into the middle rubber and the end rubber, and the radial thickness of the middle rubber and the axial thickness of the end rubber are adjusted to adjust the radial stiffness and the axial stiffness of the nodes. The sealing effect is further improved by the sealing structure design between the arc cover plate and the middle spacer sleeve.

DESCRIPTION OF THE EMBODIMENTS

The technical solution of the present invention is further described in detail below in combination with the drawings and specific embodiments.

Figure 1:
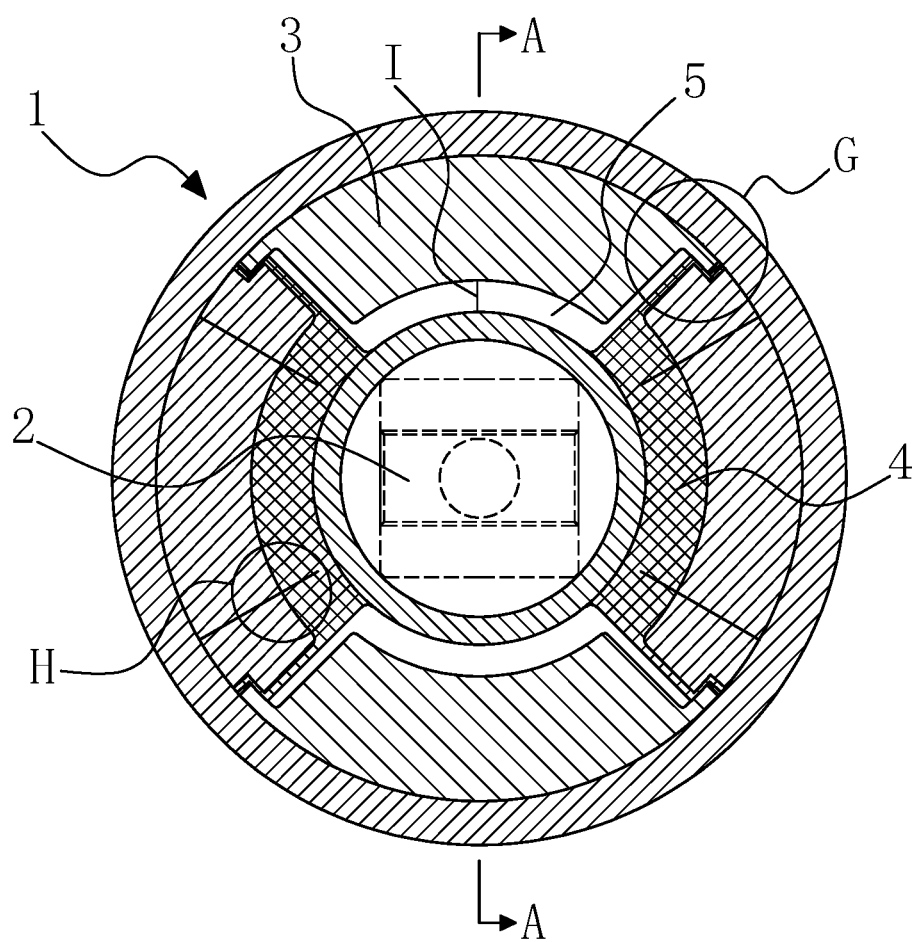
FIG. 1 is a sectional structural schematic diagram of nodes along a radial direction of a mandrel in embodiment 1 of the present invention.
Figure 2:
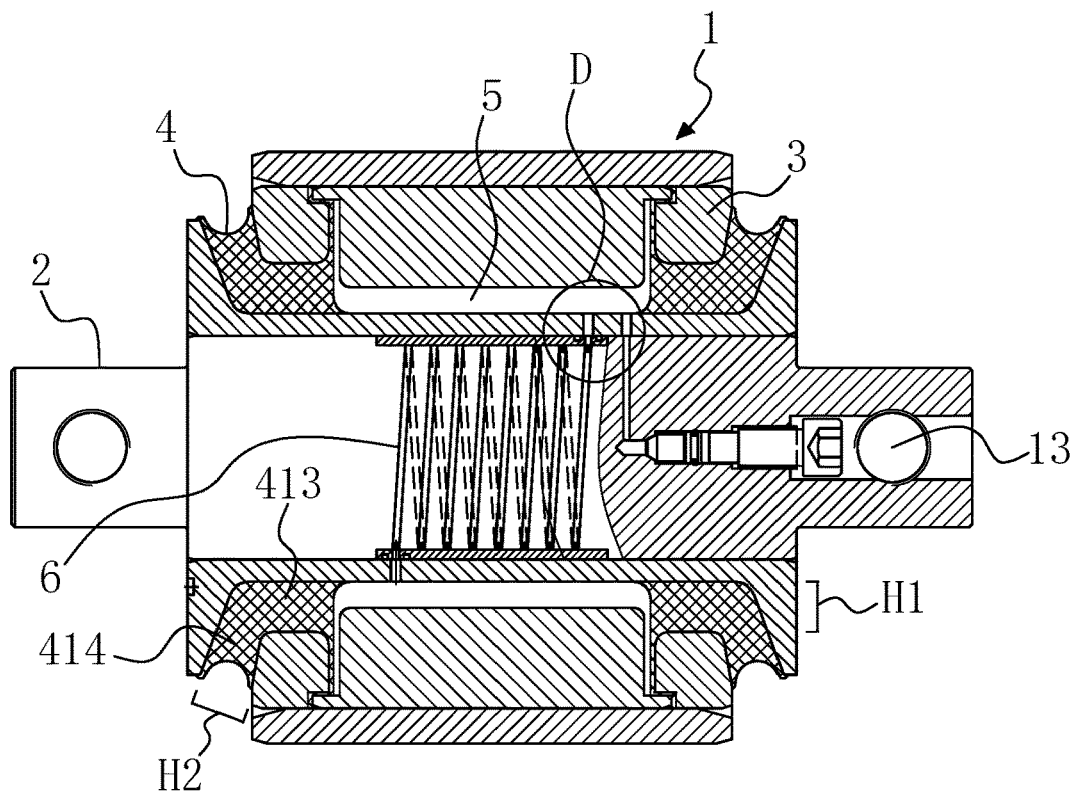
FIG. 2 is a sectional structural schematic diagram along A-A line in FIG. 1.

Embodiment 1: as shown in FIG. 1 and FIG. 2, a formation method for liquid rubber composite nodes with an internal groove flow channel includes the following steps. Adding a middle spacer sleeve 3 between an outer sleeve 1 and a mandrel 2, bonding the middle spacer sleeve 3 and the mandrel 2 together through rubber 4 vulcanization and assembling the integrated middle spacer sleeve and the mandrel into the outer sleeve 1. Installing a tubular flow channel in the mandrel 2. Hollowing the middle spacer sleeve 3 to form a plurality of spaces. After vulcanization, forming a plurality of interdependent liquid cavities 5 by using rubber 4 and the plurality of spaces. Arranging liquid in the plurality of liquid cavities 5 (not shown in the figure) and communicating the plurality of liquid cavities 5 through the tubular flow channel 6. The liquid rubber composite nodes formed by the above method can provide small radial stiffness and large axial stiffness to realize a large dynamic-static ratio, thereby optimizing the product performance of the liquid rubber composite nodes.

The test data of several samples by the applicant are as follows:

|  | Radial Stiffness | Axial Stiffness | Dynamic-Static Ratio |
|---|---|---|---|
| Sample 1 | 5.68 | 13.16 | 6.5:1 |
| Sample 2 | 5.57 | 12.62 | 7:1 |
| Sample 3 | 5.54 | 12.38 | 6:1 |
| Sample 4 | 5.34 | 13.02 | 6:1 |
| Sample 5 | 5.25 | 11.68 | 5:1 |

Figure 3:
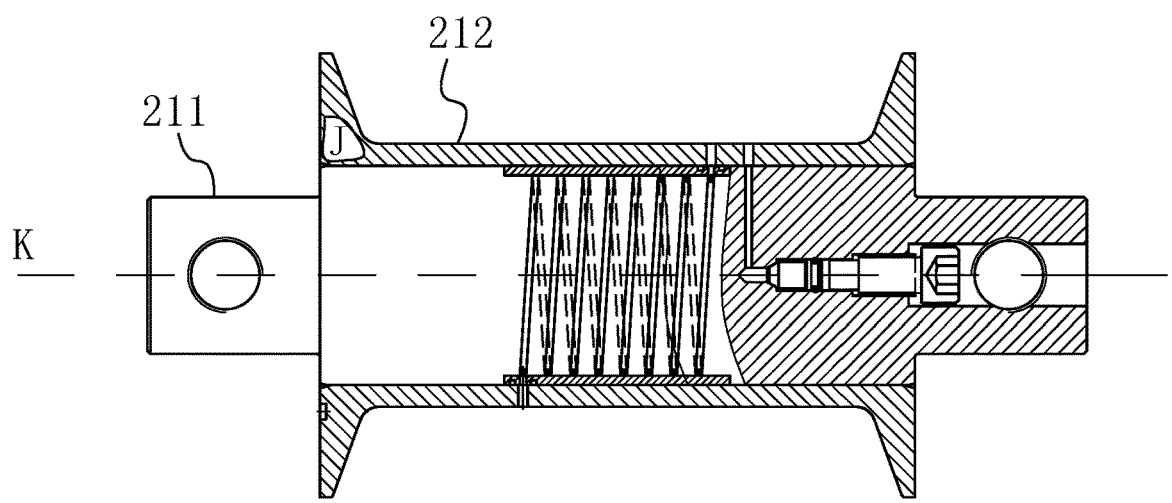
FIG. 3 is a sectional structural schematic diagram of a mandrel in FIG. 2.
Figure 4:
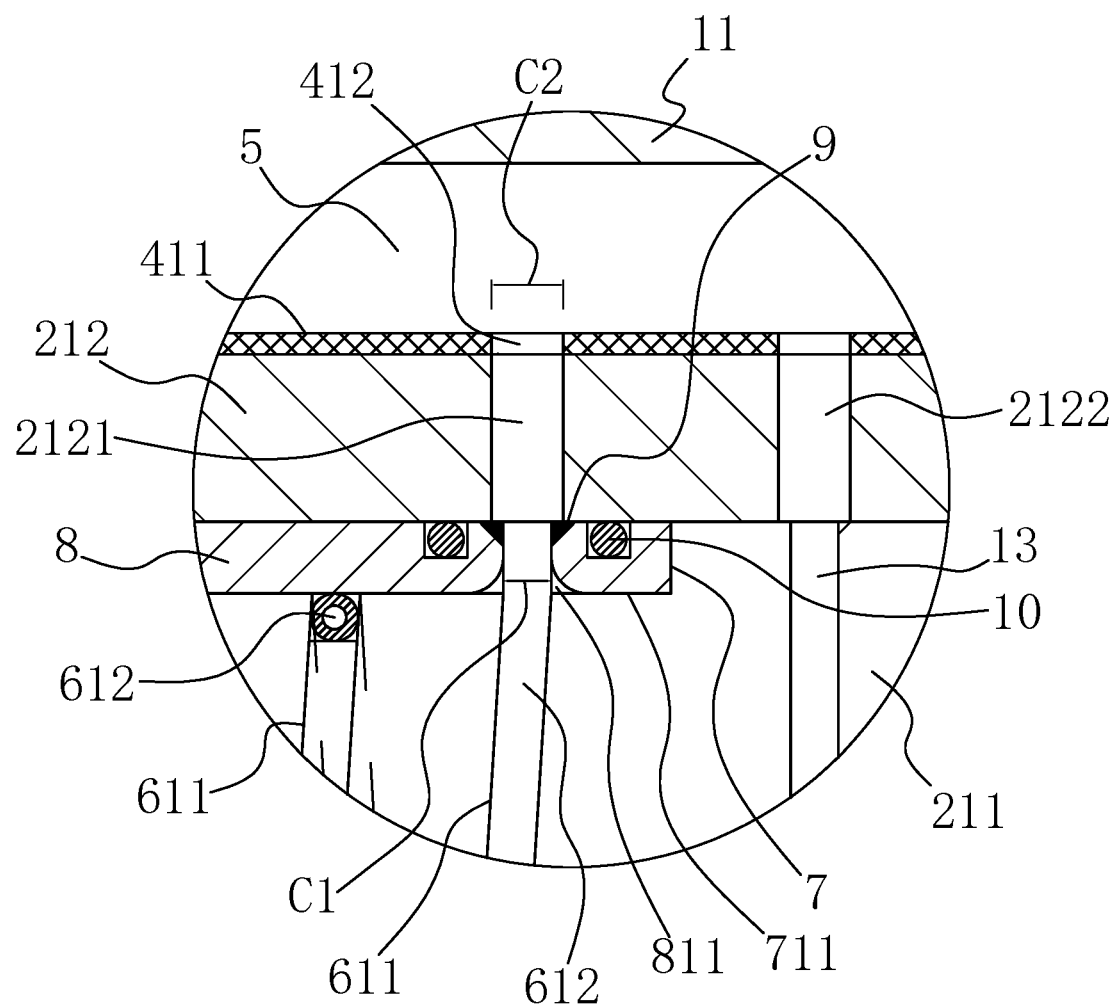
FIG. 4 is an amplified structural schematic diagram of D part in FIG. 2.

As shown in FIG. 3 and FIG. 4, the formation method of the tubular flow channel is as follows. The mandrel 2 is arranged into an inner part and an outer part. The inner part is a mandrel body 211, and the outer part is a mandrel outer sleeve 212. The mandrel body 211 is assembled into the mandrel outer sleeve 212 through interference. Flow channel grooves 611 are arranged on the outer circumferential surface of the mandrel body 211. The flow channel grooves are helically distributed around the outer circumferential surface of the mandrel body 211, and the flow channel grooves 611 may not be helically distributed here, but arranged in other shapes. Along the length direction of the flow channel grooves 611, pipe bodies 612 are arranged in the flow channel grooves 611, i.e., the pipe bodies 612 are also distributed around the outer circumferential surface of the mandrel body 211. The pipe bodies 612 can be made of copper pipes or other materials with certain flexibility. The flow channel grooves 611 play a role of positioning the pipe bodies 612, which is convenient for the assembly of the pipe bodies 612. Both ends of each pipe body 612 are respectively communicated with a plurality of liquid cavities 5. In addition, the shapes of the pipe bodies 612 on the outer circumferential surface of the mandrel body 211 can be adjusted by the shape of the surrounding state of the flow channel grooves 611. The pipe bodies are used for guiding the liquid so that the liquid can only flow along the length direction of the pipe bodies without transverse flow, so as to further enhance the reliability of the product.

The flow channel grooves 611 can be arranged in two modes. The first mode is: the flow channel grooves are directly arranged on the mandrel body 211, then the pipe bodies 612 are placed in the flow channel grooves 611, and the mandrel body 211 is assembled into the mandrel outer sleeve 212 through interference. After assembly, the inner circumferential surface of the mandrel outer sleeve 212 is in contact with the pipe bodies 612, and the pipe bodies 612 are pressed in the flow channel grooves 611. The second mode is adopted in the present embodiment (as shown in FIG. 4). Groove regions 7 are arranged in the regions that need to arrange the flow channel grooves on the outer circumferential surface of the mandrel body 211, i.e., a complete ring of groove regions 7 are arranged on the outer circumferential surface of the mandrel body 211 along the circumferential direction of the mandrel body 211, and the flow channel grooves 611 are arranged on groove bottom surfaces 711 of the groove regions 7. In this way, actually, the arrangement regions of the flow channel grooves 611 are sunk. After the pipe bodies 612 are placed in the flow channel grooves 611, pressing sleeves 8 are arranged in the groove regions 7, and the pipe bodies 612 are pressed in the flow channel grooves 611, thereby facilitating the assembly and the positioning of the pipe bodies and ensuring the stability of the pipe bodies in operation. To facilitate the installation of the pressing sleeves 8, the pressing sleeves 8 can be cut in half and installed in the groove regions 7 of the mandrel body 211.

As shown in FIG. 1 and FIG. 4, in the present embodiment, two liquid cavities are arranged (the upper liquid cavity at the top and the lower liquid cavity at the bottom in FIG. 1). During work, the two liquid cavities need to be communicated to ensure that liquid can flow back and forth between the two liquid cavities. In the present embodiment, two pressing sleeve through holes 811 are also arranged on the pressing sleeves 8, two outer sleeve through holes 2121 are arranged on the mandrel outer sleeve 212 in positions corresponding to the pressing sleeve through holes 811, and the outer sleeve through holes 2121 are communicated with the pressing sleeve through holes 811. One end of the pipe bodies 612 extends into one pressing sleeve through hole 811 and is fixedly connected with one pressing sleeve through hole 811 so that one end of the pipe bodies 612 is communicated with one liquid cavity 5 through one outer sleeve through hole 2121. The other end of the pipe bodies extends into the other pressing sleeve through hole and is fixedly connected with the other pressing sleeve through hole 811 so that the other end of the pipe bodies is communicated with the other liquid cavity 5 through the other outer sleeve through hole. Here, both ends of each pipe body are respectively welded in the two pressing sleeve through holes 811. After welding, a welding seam 9 is reserved at the end part of the pipe body. To further improve the sealing performance of the end part of the pipe body, annular sealing grooves are formed at the outer circumferential surface of the pressing sleeves 8 and on the end part of the pipe body, and annular sealing rings 10 are placed in the annular sealing grooves. After the mandrel body 211 is in interference assembly into the mandrel outer sleeve 212, the inner circumferential surface of the mandrel outer sleeve 212 is used to press the annular sealing rings 10 to form a sealing structure at the end part of the pipe body.

During assembly, to ensure that the end part of the pipe body 612 is communicated with the outer sleeve through hole 2121, the projections of the end parts of the pipe bodies 612 toward the axial projection direction of the mandrel and the projection of one end of the outer sleeve through holes 2121 toward the axial projection surface of the mandrel need to be completely coincident or partially coincident. Therefore, the diameter of the pipe bodies 612 is set as C1, and the diameter of the outer sleeve through holes 2121 is set as C2, and C1<C2, which reduces the assembly difficulty.

Figure 5:
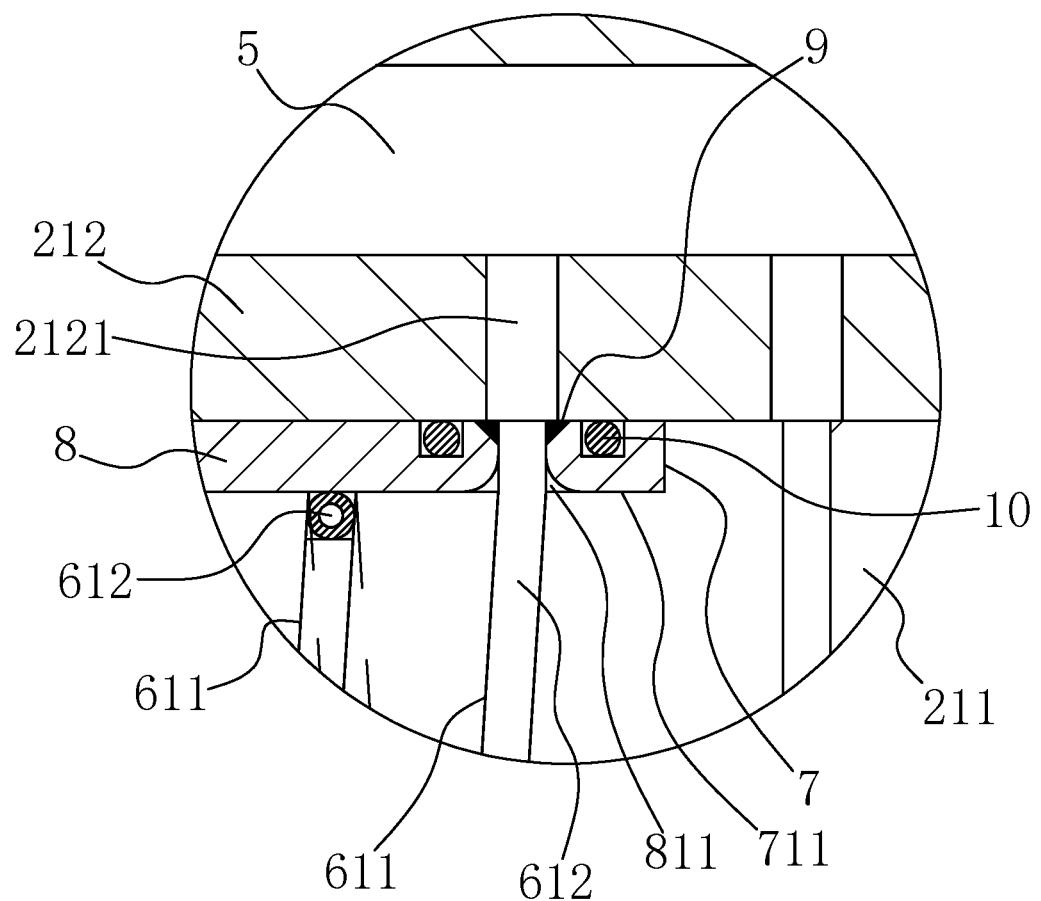
FIG. 5 is an amplified structural schematic diagram of D part in FIG. 2 when an upper surface of a mandrel is not subjected to rubber coating.

In addition, to ensure that the other end of the mandrel through hole 213 is communicated with the liquid cavity 5, it is necessary to form rubber coating through holes 412 on the upper surface rubber coating 411 of the mandrel and the lower surface rubber coating of the mandrel, so that the liquid cavities 5 are communicated with one end of the pipe body 612 through the rubber coating through holes 412 and the outer sleeve through hole 2121, which can increase certain assembly difficulty. Therefore, another solution can also be adopted. As shown in FIG. 5, the upper surface rubber coating of the mandrel and the lower surface rubber coating of the mandrel, located in the liquid cavities, are removed, or the upper surface of the mandrel and the lower surface of the mandrel, located in the liquid cavities, are not provided with the rubber coatings, so that the liquid cavities 5 are directly communicated with one end of the pipe body 612 through the outer sleeve through hole 2121, which reduces the assembly difficulty.

Figure 6:
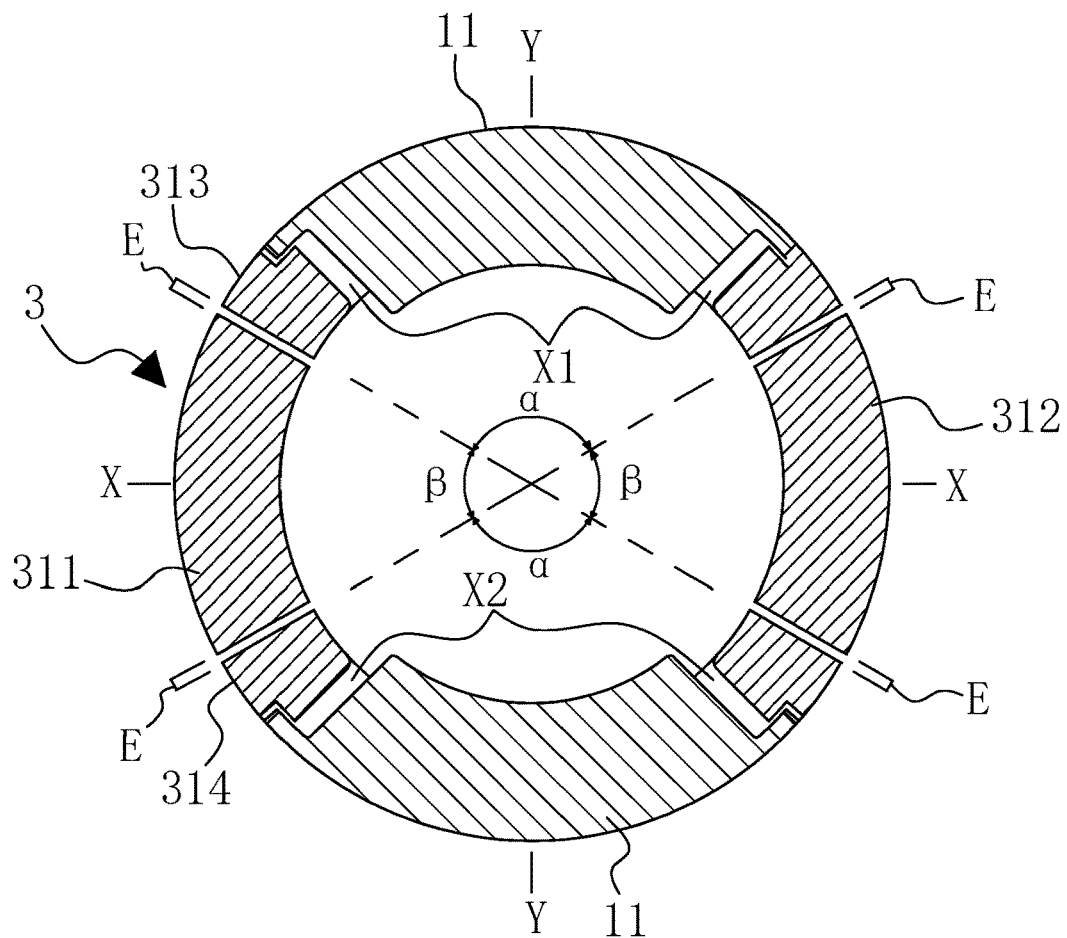
FIG. 6 is a sectional structural schematic diagram of a middle spacer sleeve along a radial direction of a mandrel in embodiment 1 of the present invention.

As shown in FIG. 1, FIG. 4 and FIG. 6, the formation method for the liquid cavities is as follows: firstly, two spaces (spaces X1 and X2 in FIG. 6) are dug out on the middle spacer sleeve 3. The space X1 and the space X2 are similar to through holes, and the outer ends and the inner ends of the spaces are open. Here, one end of the space adjacent to one side of the mandrel 2 is regarded as the inner end and one end of the space away from one side of the mandrel 2 is regarded as the outer end. In order to ensure that the liquid cavities can store the liquid, openings on both ends of each space need to be sealed so that each space is independently formed. In the present embodiment, when the openings at the inner ends of the spaces are sealed, the openings are sealed by the rubber 4, i.e., the openings at the inner ends of the spaces are blocked by the vulcanized rubber 4 after the mandrel 2 and the middle spacer sleeve 3 are bonded together through rubber 4 vulcanization. When the openings at the outer ends of the spaces are sealed, an arc cover plate 11 is covered on the hollowed middle spacer sleeve 3 and used for blocking the openings at the outer ends of the spaces so that each space forms an independent liquid cavity.

Figure 7:
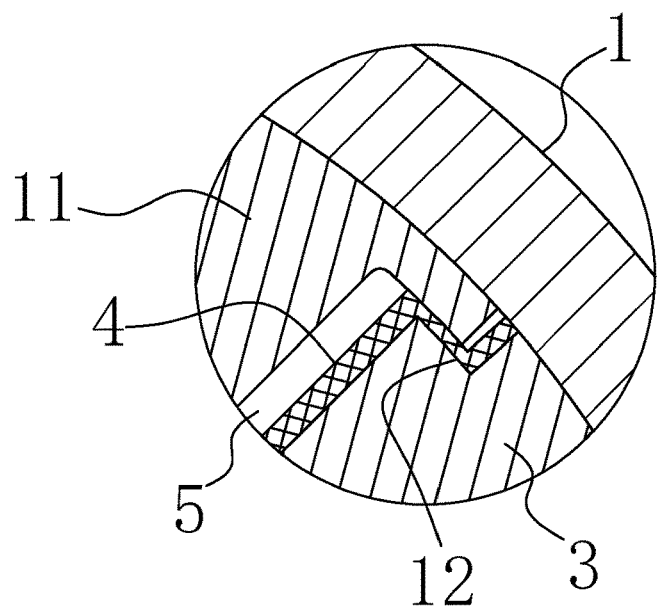
FIG. 7 is an amplified structural schematic diagram of G part in FIG. 1.

As shown in FIG. 7, a step part 12 is arranged on the middle spacer sleeve 3 at the periphery of the openings on the outer ends of the spaces. In the present embodiment, the step part 12 is a one-stage step part. A complete ring of the step part 12 is arranged along the openings at the outer ends of the spaces, and the arc cover plate 11 is covered on the step part 12. One effect of the step part 12 is to serve as a positioning structure to facilitate the positioning and assembly of the arc cover plate 11. In the present embodiment, the mandrel, the outer sleeve, the pressing sleeve, the middle spacer sleeve and the arc cover plate can be made of metal materials.

In order to further ensure the sealing performance of the openings at the outer ends of the spaces, it is also necessary to match rubber coating with pressing mounting. Namely, in the present embodiment, the rubber 4 is coated onto the step part 12. Rubber coating thickness here can be set according to actual conditions. During assembly, the mandrel 2 and the hollowed middle spacer sleeve 3 are vulcanized into a whole through the rubber 4, the rubber is coated on the step part 12, and then the arc cover plate 11 is covered on the step part 12, so that the arc cover plate 11 is in contact with the rubber coating on the step part 12, then the middle spacer sleeve 3 with the arc cover plate 11 is in interference assembly into the outer sleeve 1, and the arc cover plate 11 is pressed on the step part 12 by the acting force generated after the assembly so that the rubber coating on the step part 12 is deformed to achieve a sealing effect. After the outer sleeve 1 is assembled, a certain reduction amount can be further designed to further improve the sealing effect.

Figure 8:
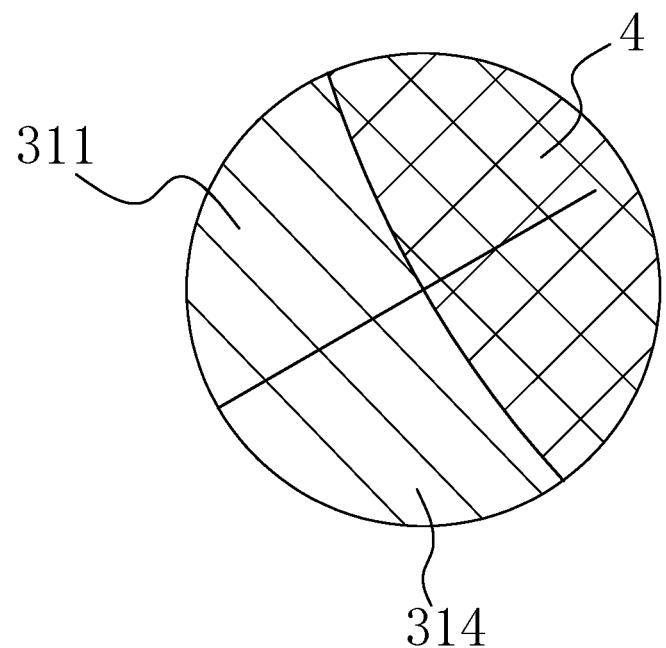
FIG. 8 is an amplified structural schematic diagram of H part in FIG. 1.
Figure 9:
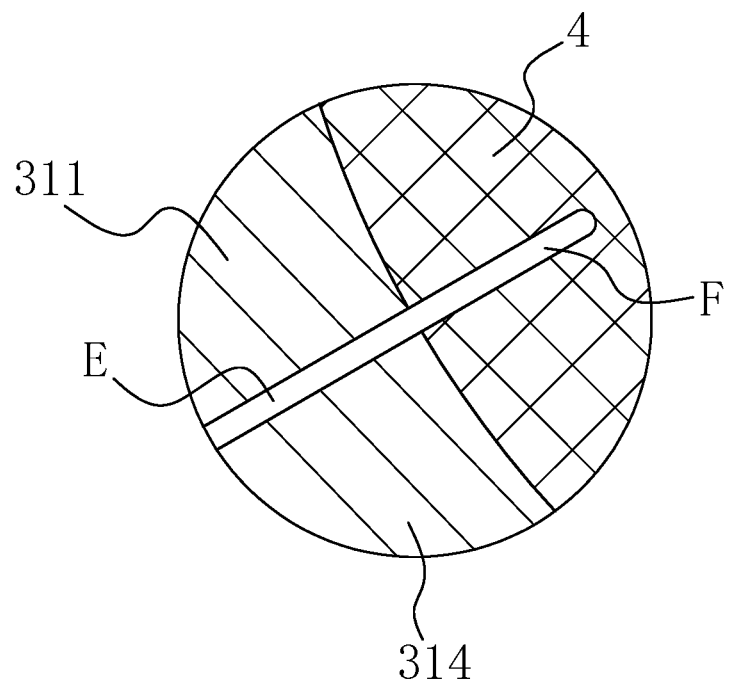
FIG. 9 is an amplified structural schematic diagram of H part in FIG. 1 when a middle spacer sleeve is not assembled in an outer sleeve.

The middle spacer sleeve adopts an integral spacer sleeve or a multi-disc spacer sleeve. In the present embodiment, the multi-disc spacer sleeve is adopted, such as two-disc structure and three-disc structure. Specifically, in the present embodiment, a four-disc structure is adopted. As shown in FIG. 6, the middle spacer sleeve 3 in the present embodiment is a four-disc spacer sleeve comprising a left arc disc body 311, a right arc disc body 312, an upper arc disc body 313 and a lower arc disc body 314. Four disc bodies are circumferentially enclosed to form a spacer sleeve. As shown in FIG. 9, after the middle spacer sleeve is bonded with the mandrel through rubber vulcanization, before interference assembly, a gap E (such as the gap E between one end of the left arc disc body 311 and one end of the lower arc disc body 314 in FIG. 9) is reserved between the end surfaces of two close ends of adjacent disc bodies, and an open gap F is also reserved in the rubber 4 and at each gap E. However, after the interference assembly of the nodes, as shown in FIG. 8, under the influence of the acting force, the gap E and the adjacent open gap F disappear, i.e., the end surfaces of two close ends of adjacent disc bodies come into contact with each other and the open gap F is also filled with the deformed rubber 4, so that the performance of the assembled product can be further enhanced. As shown in FIG. 9, in the present embodiment, the open gap F is a U-shaped groove. The opening of the U-shaped groove faces the gap E and the radial extension lines of the middle spacer sleeve on the edges of both sides of the U-shaped groove respectively coincide with the end surfaces of two close ends of two disc bodies at the gap E. The depth of the U-shaped groove is designed according to the actual assembling conditions. The open gap F is set to ensure that the end surfaces of two close ends of each disc body come into contact with each other after the assembly, and the rubber may not enter therebetween.

In the design of the multi-disc middle spacer sleeve, equal design or non-equal design can be adopted. In the present embodiment, the non-equal design is adopted, i.e., by taking a center point of the middle spacer sleeve as a circle point, circle center angles corresponding to the plurality of arc disc bodies are unequal. As shown in FIG. 6, the circle center angles corresponding to the radian of the upper arc disc body 313 and the lower arc disc body 314 are set as $\alpha$, and the circle center angles corresponding to the left arc disc body 311 and the right arc disc body 312 are set as $\beta$, and $\alpha>\beta$. This is because in the present embodiment, the hollowed arc disc bodies are the radian of the upper arc disc body 313 and the lower arc disc body 314. After hollowing, by taking the radian of the upper arc disc body 313 and the direction of the lower arc disc body 314 (Y direction in the figure) as a void direction and taking the direction of the left arc disc body 311 and the right arc disc body 312 (X direction in the figure) as a solid direction, the radian of the arc disc body in the void direction is maximized to maximize the volume of the liquid cavities, thereby benefiting the improvement of product performance. In addition, the radial stiffness in the void direction can be reduced. In the present embodiment, $\alpha$ is 120 degrees and $\beta$ is 60 degrees.

The hollowed disc bodies may be any disc body in the multi-disc middle spacer sleeve. In the present embodiment, the radian of the upper arc disc body 313 and the lower arc disc body 314, which are symmetrically arranged about the axial direction of the mandrel 2, are hollowed to form the liquid cavities.

Figure 10:
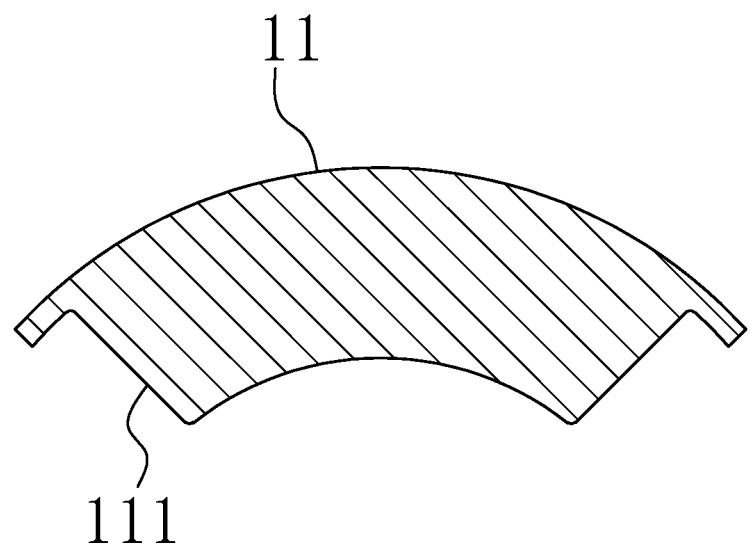
FIG. 10 is a sectional structural schematic diagram of an arc cover plate in FIG. 6.

In order to provide nonlinear stiffness properties by liquid rubber, a design solution of a matching structure between the metal cover and the mandrel is adopted. As shown in FIG. 1 and FIG. 10, the inner circumferential arc surface of the arc cover plate 11 is provided with a bump 111 that protrudes towards the mandrel 2. During work, when the node is loaded, the bump 111 comes into contact with the rubber 4 to provide nonlinear stiffness properties, and under the further effect of the load, the bump 111 comes into contact with the mandrel 2 to form the protection function of hard stop limiting. In the present embodiment, the lower circumferential surface of one end of the bump 111 near the mandrel 2 is configured as an arc surface, and the curvature of the arc surface is matched with the curvature of the mandrel. The volume size of the bump 111 can be designed according to the actual needs. By controlling the size of the bump 111, the volume size of the liquid cavities 5 can be controlled, making the nodes become the nodes of large-volume liquid cavities and the nodes of small-volume liquid cavities. The nodes of the large-volume liquid cavities can accommodate more liquid. The nodes of the small-volume liquid cavities can provide larger dynamic stiffness properties under the same stiffness. In the present embodiment, the volume of the bump 111 is designed to be large, so that the nodes become the nodes of the small-volume liquid cavities. A gap between the lower circumferential surface of one end of the bump 111 near the mandrel 2 and the mandrel 2 is set as I. A nonlinear stiffness curve can be adjusted by adjusting the size of the gap I. In the present embodiment, bumps 111 are arranged on the inner circumferential arc surfaces of two arc cover plates 11. The two bumps 111 are respectively located in two liquid cavities 5.

As shown in FIG. 3, the mandrel outer sleeve 212 is formed as follows: a mandrel outer sleeve is formed by taking a central axis K of the mandrel outer sleeve 212 as a bus and taking a saddle surface J, which is high at both ends and low in the middle, as a rotating surface. As shown in FIG. 2, through this arrangement of the mandrel outer sleeve 212, the rubber 4 between the mandrel outer sleeve 212 and the middle spacer sleeve 3 is divided into two parts. One part of the rubber is middle rubber 413, and the other part of the rubber is end rubber 414 located at both ends of the middle rubber 413. The thickness of the middle rubber 413 along the radial direction of the mandrel is set as radial thickness H1, and the thickness of the end rubber 414 along the axial direction of the mandrel is set as axial thickness H2. During a work, the middle rubber 413 mainly provides the radial stiffness, and the end rubber 414 mainly provides the axial stiffness. In this way, the radial thickness H1 and the axial thickness H2 are adjusted to adjust the radial stiffness and the axial stiffness of the nodes.

A liquid injection hole 13 is also arranged on the mandrel 2. The liquid injection hole 13 is communicated with the liquid cavity 5. At the beginning, the liquid is injected into the liquid cavity 5 through the liquid injection hole 13, and then sealed. As shown in FIG. 4, before sealing, one end of the liquid injection hole 13 is communicated with the outside, and the other end of the liquid injection hole 13 is communicated with the liquid injection through hole 2122 formed on the mandrel outer sleeve 212. The liquid injection through hole 2122 is communicated with a liquid cavity 5, so that the other end of the liquid injection hole 13 is communicated with a liquid cavity 5 to facilitate liquid injection.

Figure 11:
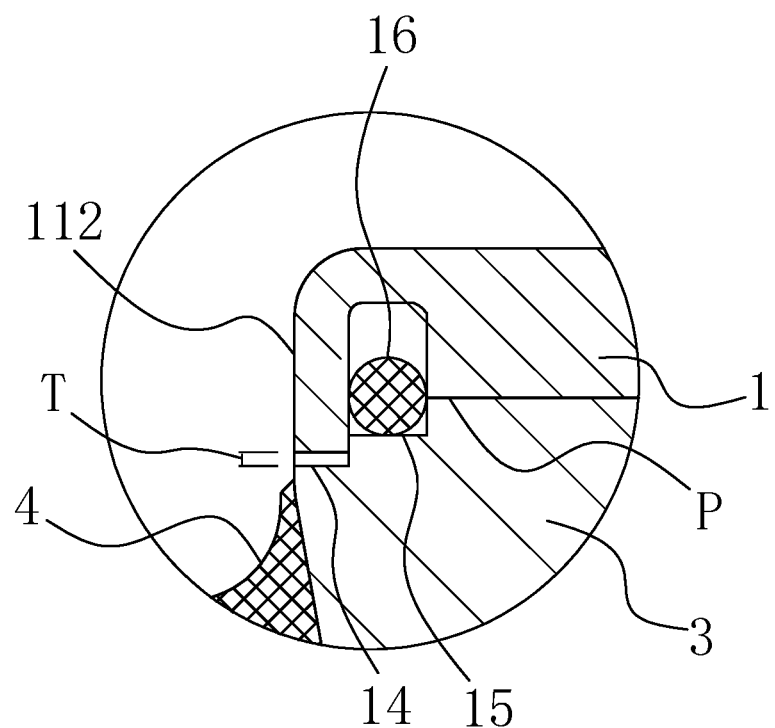
FIG. 11 is a local sectional structural schematic diagram of nodes sectioned along an axial direction of a mandrel and located at an end part of one end of an outer sleeve in embodiment 2 of the present invention.

Embodiment 2: as shown in FIG. 11, compared with embodiment 1, the difference of the present embodiment is that: both ends of the outer sleeve 1 in the present embodiment adopt flanging buckling design structures. A first continuous step part 14 and a second step part 15 are arranged on one end of the middle spacer sleeve 3. The first step part 14 is positioned in a lower position (near the mandrel), and the second step part 15 is positioned in an upper position (far away from the mandrel). The end surface of one end of the outer sleeve 1 is vertically flush with the side vertical surface of the second step part 15. An end sealing ring 16 is arranged on the second step part 15. When the flanging buckling is not performed, the height of the end sealing ring 16 is larger than the height of the second step part 15, i.e., the end sealing ring 16 is positioned between the second step part 15 and the outer sleeve 1. An outer sleeve flanging part 112 is extended on the end surface of one end of the outer sleeve 1. During flanging operation, the end sealing ring 16 is pressed by flanging and bending the outer sleeve flanging part 112, and the end sealing ring 16 is used to seal an end gap P of the contact surface between the outer sleeve 1 and the middle spacer sleeve 3 to further enhance the sealing performance of the node. The outer sleeve flanging part 112 is flanged to the side vertical surface of the first step part 14, so as to flange and position the flanging operation by the first step part 14. After the flanging operation, a gap T is reserved between the end part of the outer sleeve flanging part 112 and a horizontal bottom surface of the first step part 14.

The other end of the middle spacer sleeve 3 is also provided with a continuous first step part and a second step part, and the end surface of the other end of the overall outer sleeve is also extended with the outer sleeve flanging part. The flanging buckling design structure at the other end of the middle spacer sleeve is the same as the flanging buckling design structure at one end of the above middle spacer sleeve, and will not be repeated here.

Figure 12:
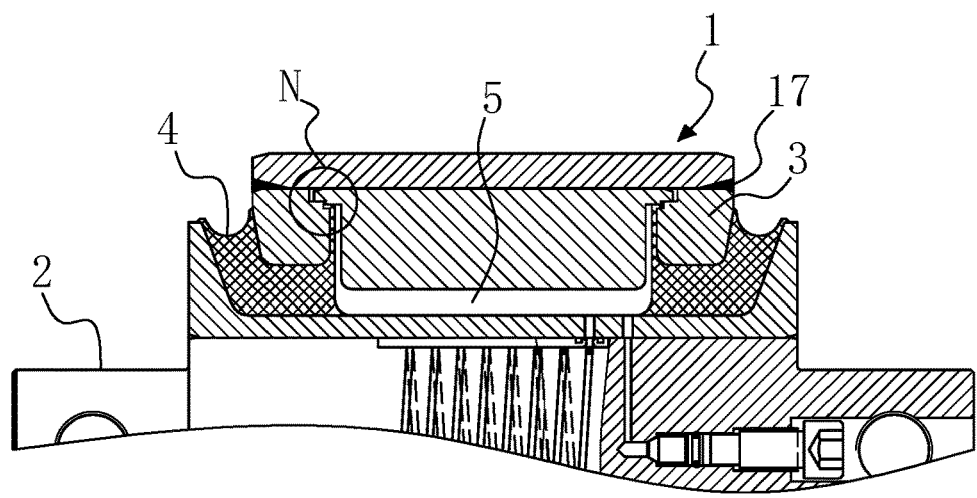
FIG. 12 is a local sectional structural schematic diagram of nodes sectioned along an axial direction of a mandrel in embodiment 3 of the present invention.
Figure 13:
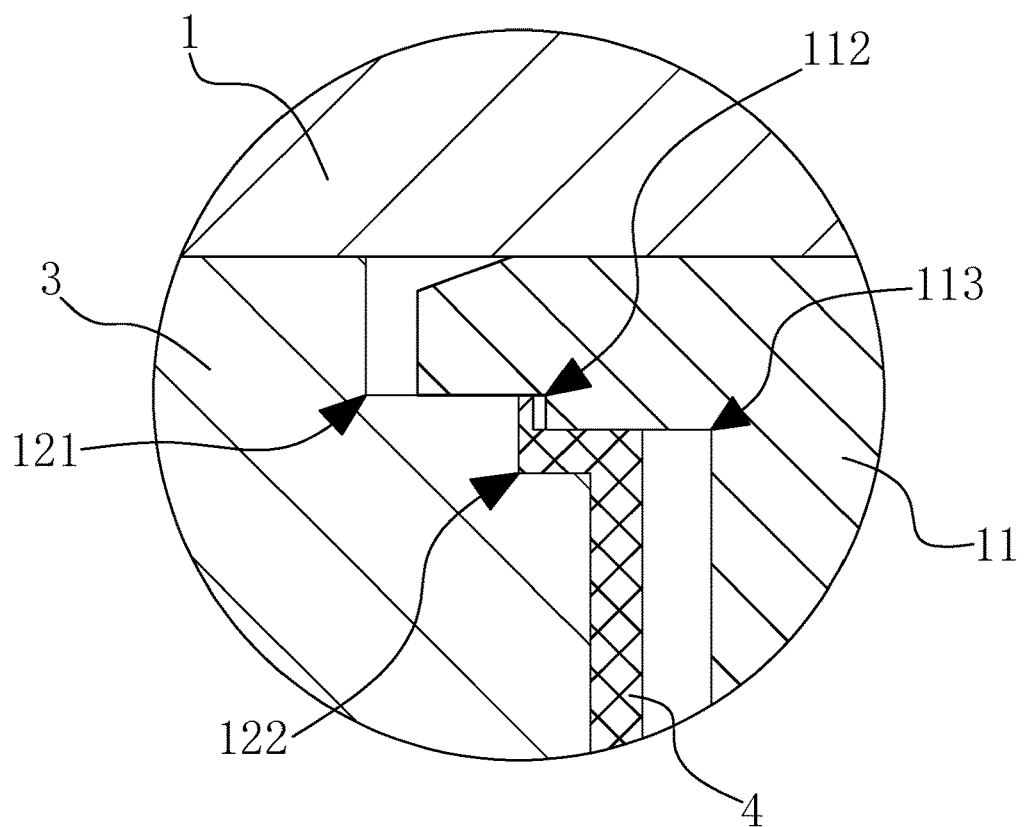
FIG. 13 is an amplified structural schematic diagram of N part in FIG. 12.

Embodiment 3: as shown in FIG. 12 and FIG. 13, compared with embodiment 1, the differences are that: the step part 12 arranged on the middle spacer sleeve 3 is a two-stage step and has a first spacer sleeve step part 121 and a second spacer sleeve step part 122. The first spacer sleeve step part 121 is located near one side of the outer sleeve 1, i.e., the outer side, and the second spacer sleeve step part 122 is located near one side of the mandrel, i.e., the inner side. The rubber is coated to the second spacer sleeve step part 122, and the arc cover plate 11 at the contact point with the step part is correspondingly arranged into the shape of multi-stage steps, including a first cover plate step part 112 and a second cover plate step part 113. During assembly, when the arc cover plate 11 is covered on the step part 12, the first cover plate step part 112 is connected with the first spacer sleeve step part 121 in a metal interference fit mode, and the second cover plate step part 113 is connected with the second spacer sleeve step part 122 in a rubber-metal over-pressure fit mode, i.e., the rubber 4 is pressed on the second spacer sleeve step part 122 by the second cover plate step part 113. This arrangement avoids the problem of internal liquid leakage caused by the failure of over-pressure fit between the metal and the rubber due to the relaxation of the rubber after long-term use.

After the integral middle spacer sleeve and the mandrel are assembled into the outer sleeve 1, the end part of contact between the outer sleeve 1 and the middle spacer sleeve 3 is chamfered, and then applied with solid gum 17 to further increase the sealing effect.

Figure 14:
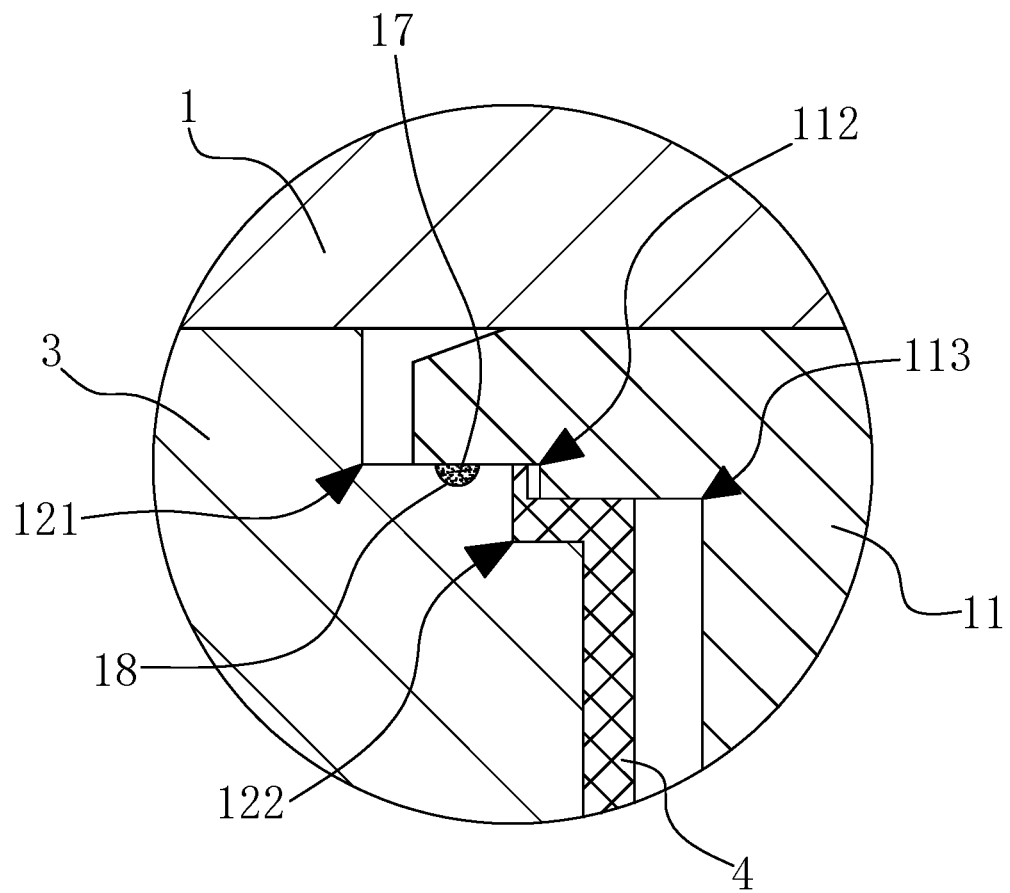
FIG. 14 is a local sectional structural schematic diagram of nodes sectioned along an axial direction of a mandrel and located at a step part of a middle spacer sleeve in embodiment 4 of the present invention.

Embodiment 4: as shown in FIG. 14, compared with embodiment 3, the differences are that: a rubber groove 18 is arranged on the first spacer sleeve step part 121. Before assembly, the solid gum 17 is applied in the rubber groove 18. During assembly, when the first cover plate step part 112 and the first spacer sleeve step part 121 are connected by the metal interference fit mode, the solid gum is also in contact with the first cover plate step part 112 to further increase the sealing effect.

Figure 15:
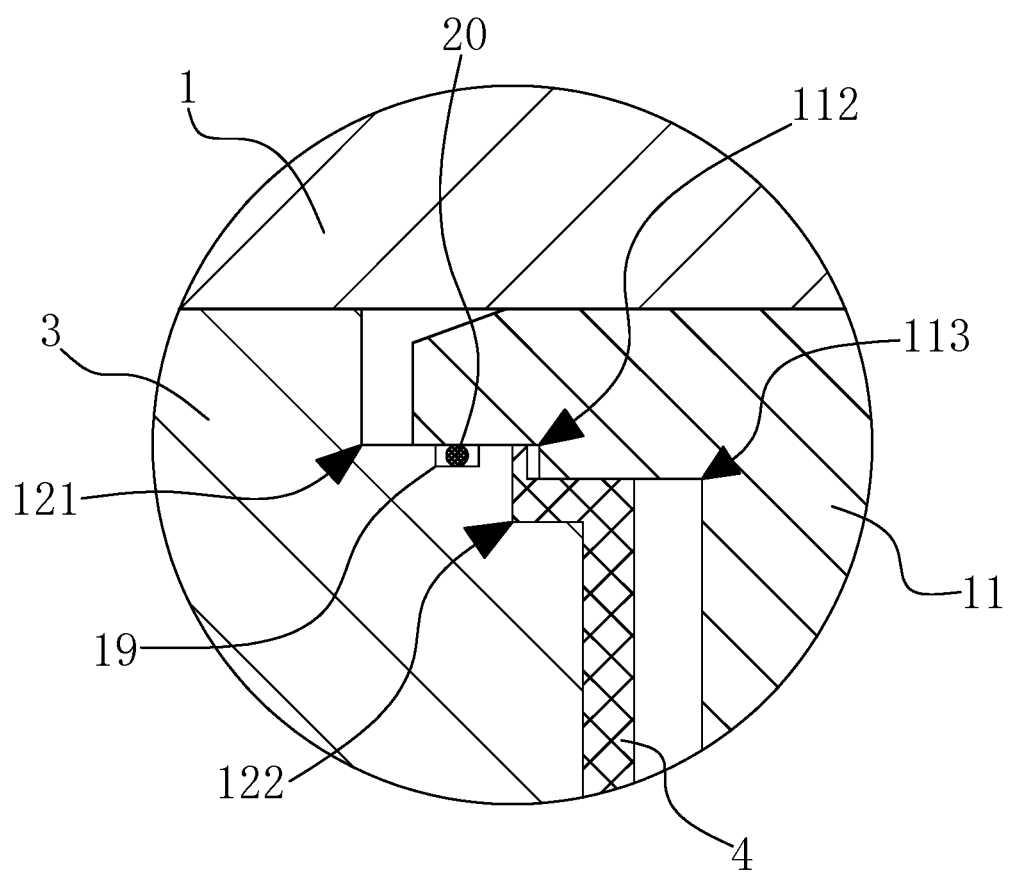
FIG. 15 is a local sectional structural schematic diagram of nodes sectioned along an axial direction of a mandrel and located at a step part of a middle spacer sleeve in embodiment 5 of the present invention.

Embodiment 5: as shown in FIG. 15, compared with embodiment 3, the differences are that: a sealing groove 19 is formed on the first spacer sleeve step part 121. Before assembly, a sealing ring 20 is assembled in the sealing groove 19. During assembly, when the first cover plate step part 112 and the first spacer sleeve step part 121 are connected in the metal interference fit mode, the sealing ring 20 is also pressed in the sealing groove 19 by the first cover plate step part 112 to further increase the sealing effect.

Figure 16:
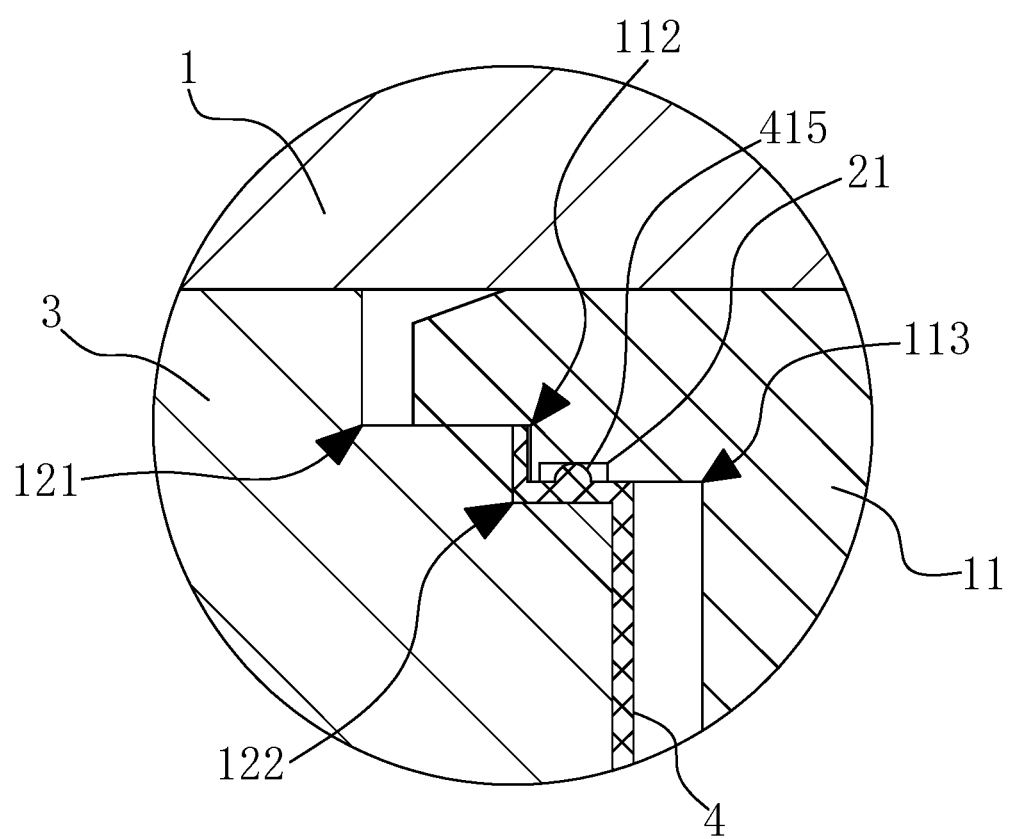
FIG. 16 is a local sectional structural schematic diagram of nodes sectioned along an axial direction of a mandrel and located at a step part of a middle spacer sleeve in embodiment 6 of the present invention.

Embodiment 6: as shown in FIG. 16, compared with embodiment 3, the differences are that: a cover plate sealing groove 21 is formed on the second cover plate step part 113. When the rubber is coated on the second spacer sleeve step part 122, a sealing bulge 415 is formed on the rubber 4. During assembly, when the second cover plate step part 113 presses the rubber 4 onto the second spacer sleeve step part 122, the sealing bulge 415 is positioned in the cover plate sealing groove 21 and is extruded and contacted by the cover plate sealing groove 21.

Figure 17:
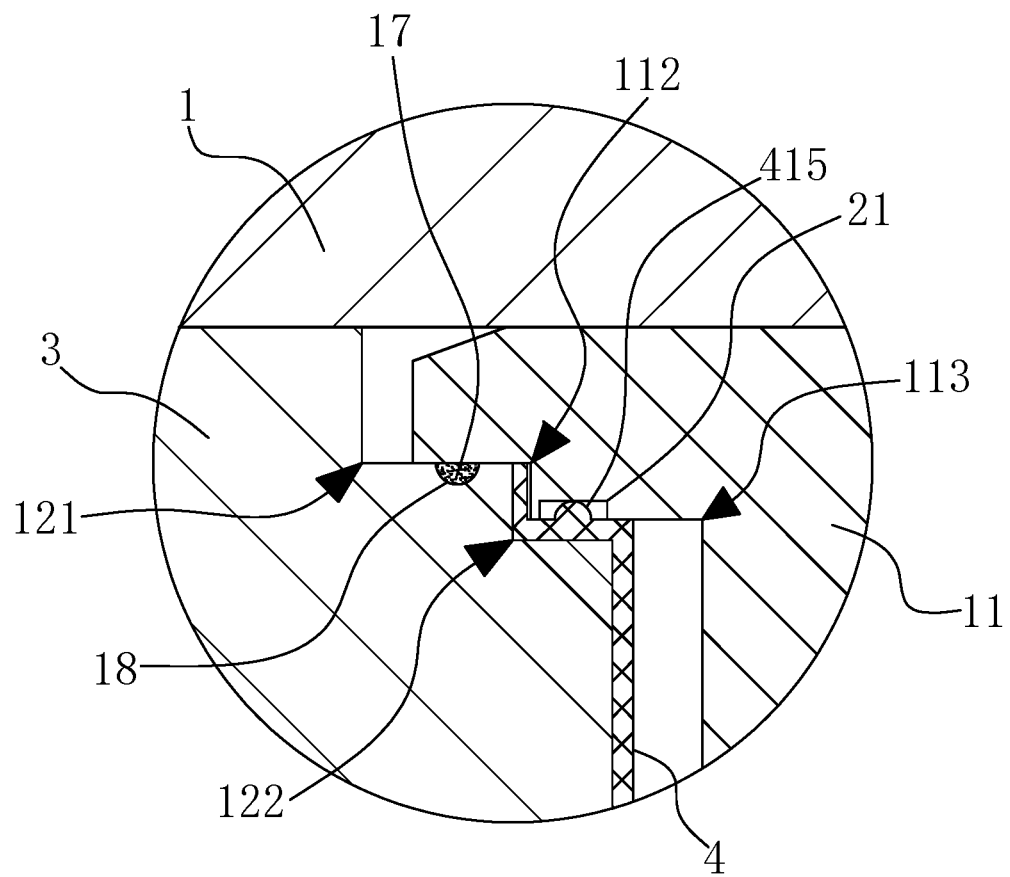
FIG. 17 is a local sectional structural schematic diagram of nodes sectioned along an axial direction of a mandrel and located at a step part of a middle spacer sleeve in embodiment 7 of the present invention.

Embodiment 7: as shown in FIG. 17, compared with embodiment 3, the differences are that: in the present embodiment, the sealing forms in embodiment 6 and embodiment 4 can also be combined to further enhance the sealing effect, i.e., a cover plate sealing groove 21 is formed on the second cover plate step part 113. When the rubber is coated on the second spacer sleeve step part 122, a sealing bulge 415 is formed on the rubber 4. During assembly, when the second cover plate step part 113 presses the rubber 4 onto the second spacer sleeve step part 122, the sealing bulge 415 is positioned in the cover plate sealing groove 21 and is extruded and contacted by the cover plate sealing groove 21. A rubber groove 18 is arranged on the first spacer sleeve step part 121. Before assembly, the solid gum is applied in the rubber groove 18. During assembly, when the first cover plate step part 112 and the first spacer sleeve step part 121 are connected by the metal interference fit mode, the solid gum is also in contact with the first cover plate step part 112 to further increase the sealing effect.

Figure 18:
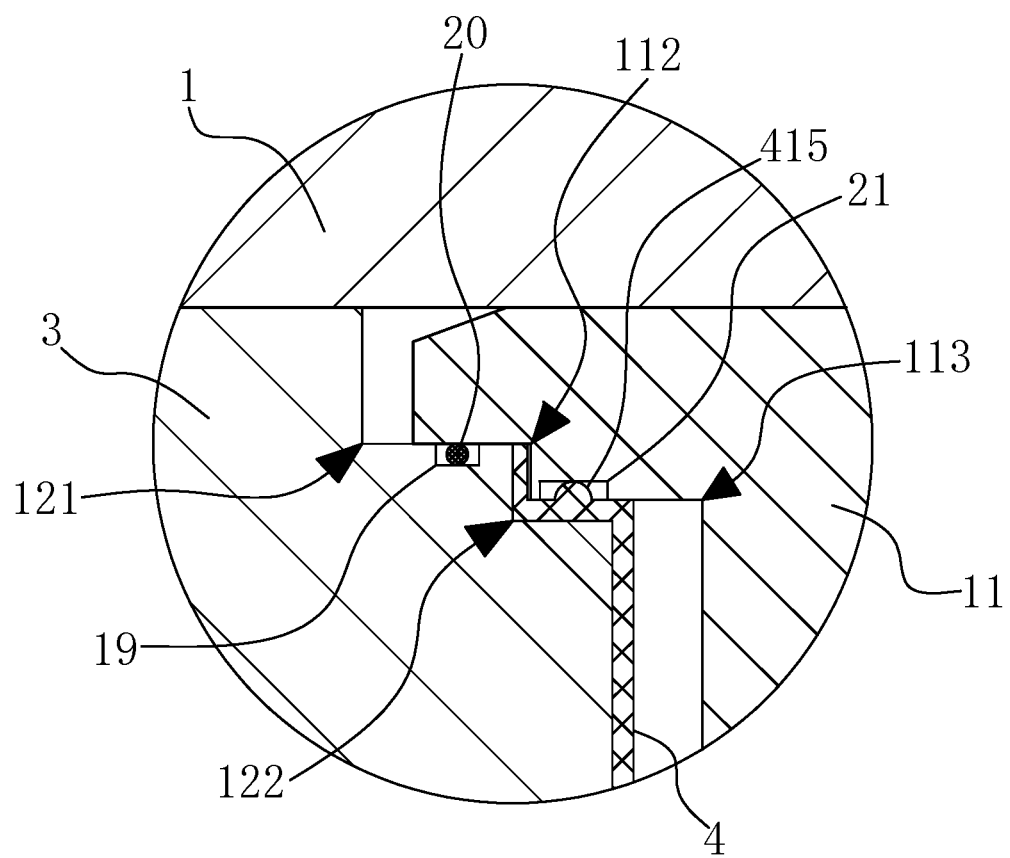
FIG. 18 is a local sectional structural schematic diagram of nodes sectioned along an axial direction of a mandrel and located at a step part of a middle spacer sleeve in embodiment 8 of the present invention.

Embodiment 8: as shown in FIG. 18, compared with embodiment 6, the differences are that: in the present embodiment, the sealing forms in embodiment 6 and embodiment 5 can also be combined to further enhance the sealing effect, i.e., a cover plate sealing groove 21 is formed on the second cover plate step part 113. When the rubber is coated on the second spacer sleeve step part 122, a sealing bulge 415 is formed on the rubber 4. During assembly, when the second cover plate step part 113 presses the rubber 4 onto the second spacer sleeve step part 122, the sealing bulge 415 is positioned in the cover plate sealing groove 21 and is extruded and contacted by the cover plate sealing groove 21. A sealing groove 19 is formed on the first spacer sleeve step part 121. Before assembly, a sealing ring 20 is assembled in the sealing groove 19. During assembly, when the first cover plate step part 112 and the first spacer sleeve step part 121 are connected in the metal interference fit mode, the sealing ring 20 is also pressed in the sealing groove 19 by the first cover plate step part 112 to further increase the sealing effect.

In conclusion, the present invention forms a plurality of independent liquid cavities capable of storing liquid by hollowing and vulcanizing the rubber on the middle spacer sleeve, then installs the tubular flow channel on the mandrel, and communicates the plurality of liquid cavities by the tubular flow channel to form liquid rubber composite nodes, so as to provide small radial stiffness and large axial stiffness to realize a large dynamic-static ratio, thereby optimizing the product performance of the liquid rubber composite nodes. The pipe bodies are used for guiding the liquid so that the liquid can only flow along the length direction of the pipe bodies without transverse flow, so as to further enhance the reliability of the product. The formation method of the flow channel of the pipe bodies is designed to facilitate the assembly of the product. Through the design of the specific formation method of the liquid cavities, the liquid cavities can be formed smoothly and the quality of the product is guaranteed. When the middle spacer sleeve is designed into a multi-disc spacer sleeve, the assembly structure and the process thereof are designed so as to ensure that after the interference assembly is completed, direct contact is made between the end surfaces of the two adjacent ends of the adjacent disc bodies without rubber interference, which can further improve the performance of the assembled product. When the middle spacer sleeve is designed into a multi-disc spacer sleeve, the non-equal design is adopted for the middle spacer sleeve, and the volume space of the liquid cavities is enlarged as much as possible. The rubber in the middle of the middle spacer sleeve is divided into the middle rubber and the end rubber, and the radial thickness of the middle rubber and the axial thickness of the end rubber are adjusted to adjust the radial stiffness and the axial stiffness of the nodes. The sealing effect is further improved by the sealing structure design between the arc cover plate and the middle spacer sleeve.

"A plurality of" in the present embodiment means a quantity of "two or more than two". The above embodiments are merely used for illustration of the present invention, and not intended to limit the present invention. Various changes or transformations can also be made by those skilled in the art without departing from the spirit and the scope of the present invention. Therefore, all equivalent technical solutions shall also belong to the protection scope of the present invention, and the protection scope of the present invention shall be defined by the claims.

What is claimed is:

1. A formation method for liquid rubber composite nodes with a tubular flow channel, the formation method comprising:
    adding a middle spacer sleeve between an outer sleeve and a mandrel, bonding the middle spacer sleeve and the mandrel together through rubber vulcanization, and assembling the integrated middle spacer sleeve and the mandrel into the outer sleeve;
    installing a tubular flow channel in the mandrel;
    hollowing the middle spacer sleeve to form a plurality of spaces;
    after vulcanization, forming a plurality of interdependent liquid cavities by using rubber and the plurality of spaces; and
    arranging liquid in the plurality of liquid cavities and communicating the plurality of liquid cavities through the tubular flow channel,
    wherein the tubular flow channel is formed as follows: the mandrel is arranged into an inner part and an outer part; the inner part is a mandrel body, and the outer part is a mandrel outer sleeve; the mandrel body is assembled into the mandrel outer sleeve; flow channel grooves are arranged on an outer circumferential surface of the mandrel body; the flow channel grooves are distributed around the outer circumferential surface of the mandrel body; a pipe body is arranged in each flow channel groove along a length direction of the flow channel groove; and both ends of the pipe body are respectively communicated with the plurality of liquid cavities,
    wherein the middle spacer sleeve adopts an integral spacer sleeve or a multi-disc spacer sleeve; two liquid cavities are arranged; and the two liquid cavities are symmetrically distributed on the middle spacer sleeve about an axis of the middle spacer sleeve, and
    wherein the mandrel outer sleeve is formed by taking a central axis of the mandrel outer sleeve as a bus, and taking a saddle surface, which is high at both ends and low in a middle, as a rotating surface;
    the rubber between the mandrel outer sleeve and the middle spacer sleeve is divided into two parts; one part of the rubber is middle rubber, and the other part of the rubber is end rubber located at both ends of the middle rubber; a thickness of the middle rubber along a radial direction of the mandrel is set as radial thickness, and a thickness of the end rubber along an axial direction of the mandrel is set as axial thickness; and the radial thickness and the axial thickness are adjusted to adjust a radial stiffness and an axial stiffness of the nodes.

2. The formation method for liquid rubber composite nodes with the tubular flow channel according to claim 1, wherein the flow channel grooves are arranged in a first arrangement mode or a second arrangement mode;
the first arrangement mode is that the flow channel grooves are directly arranged on the outer circumferential surface of the mandrel body; then the pipe bodies are placed in the flow channel grooves; the mandrel body is assembled into the mandrel outer sleeve; after assembly, the inner circumferential surface of the mandrel outer sleeve is in direct contact with the pipe bodies; and the pipe bodies are pressed in the flow channel grooves;
the second arrangement mode is that groove regions are arranged on the outer circumferential surface of the mandrel body; then the flow channel grooves are arranged on bottom surfaces of the groove regions; the pipe bodies are placed in the flow channel grooves; pressing sleeves are arranged in the groove regions; and the pipe bodies are pressed in the flow channel grooves by the pressing sleeves.

3. The formation method for liquid rubber composite nodes with the tubular flow channel according to claim 1, wherein the liquid cavities is formed as follows: firstly, the plurality of spaces are dug out on the middle spacer sleeve; the spaces are similar to through holes, and outer ends and inner ends of the spaces are open; when openings at the inner ends of the spaces are sealed, the openings at the inner ends of the spaces are blocked by the vulcanized rubber after the mandrel and the middle spacer sleeve are bonded together through rubber vulcanization; when openings at the outer ends of the spaces are sealed, an arc cover plate is covered on the hollowed middle spacer sleeve and configured for blocking the openings at the outer ends of the spaces; and the plurality of spaces form the plurality of liquid cavities.

4. The formation method for liquid rubber composite nodes with the tubular flow channel according to claim 3, wherein a bump protruding towards the mandrel is arranged on an inner circumferential arc surface of the arc cover plate; the bump comes into contact with the rubber to provide nonlinear stiffness, and the bump comes into contact with the mandrel to form hard stop limiting.

5. The formation method for liquid rubber composite nodes with the tubular flow channel according to claim 4, wherein when the openings at the outer ends of the spaces are sealed, a step part is arranged on the middle spacer sleeve, a complete ring of the step part is arranged along the openings at the outer ends of the spaces, and the arc cover plate is covered on the step part.

6. The formation method for liquid rubber composite nodes with the tubular flow channel according to claim 5, wherein the step part is a one-level step; during assembly, the rubber is coated on the step part and the arc cover plate is covered on the step part, such that the arc cover plate is in contact with the rubber coating on the step part.

7. The formation method for liquid rubber composite nodes with the tubular flow channel according to claim 5, wherein the step part is a multi-level step comprising an one-level outer spacer sleeve step part and a multi-level inner spacer sleeve step part; during assembly, the rubber is coated on the multi-level inner spacer sleeve step part and the arc cover plate is covered on the step part, such that the arc cover plate is connected in interference fit with the first-level outer spacer sleeve step part, and the arc cover plate is connected to the multi-level inner spacer sleeve step part in a rubber over-pressure fit mode.

8. The formation method for liquid rubber composite nodes with the tubular flow channel according to claim 7, wherein the step part is a two-level step and is provided with a first spacer sleeve step part and a second spacer sleeve step part; the spacer first sleeve step part is the outer spacer sleeve step part; the second spacer sleeve step part is the inner spacer sleeve step part; the rubber is coated up to the second spacer sleeve step part; the arc cover plate in contact with the step part is correspondingly arranged into a multi-stage step shape, the arc cover plate includes a first cover plate step part and a second cover plate step part; during assembly, when the arc cover plate is covered on the step part, the first cover plate step part is connected in an interference fit with the first spacer sleeve step part, and the second cover plate step part is connected with the second spacer sleeve step part in the rubber over-pressure fit mode.

9. The formation method for liquid rubber composite nodes with the tubular flow channel according to claim 8, wherein a rubber groove is arranged on the first spacer sleeve step part; before assembly, solid gum is applied in the rubber groove; and during assembly, when the first cover plate step part and the first spacer sleeve step part are connected in interference fit, the solid gum is in contact with the first cover plate step part.

10. The formation method for liquid rubber composite nodes with the tubular flow channel according to claim 8, wherein a sealing groove is formed on the first spacer sleeve step part; before assembly, a sealing ring is assembled in the sealing groove; and during assembly, when the first cover plate step part and the first spacer sleeve step part are connected in interference fit.

11. The formation method for liquid rubber composite nodes with the tubular flow channel according to claim 8, wherein a cover plate sealing groove is formed on the second cover plate step part; when the rubber is coated on the second spacer sleeve step part, a sealing bulge is formed on the rubber; and during assembly, when the second cover plate step part is connected to the second spacer sleeve step part in the rubber over-pressure fit mode, the sealing bulge is positioned in the cover plate sealing groove and is extruded and contacted by the cover plate sealing groove.

12. The formation method for liquid rubber composite nodes with the tubular flow channel according to claim 11, wherein a rubber groove is arranged on the spacer first sleeve step part; before assembly, solid gum is applied in the rubber groove; and during assembly, when the first cover plate step part and the first spacer sleeve step part are connected in interference fit, the solid gum is in contact with the first cover plate step part.

13. The formation method for liquid rubber composite nodes with the tubular flow channel according to claim 11, wherein a sealing groove is formed on the first spacer sleeve step part; before assembly, a sealing ring is assembled in the sealing groove; and during assembly, when the first cover plate step part and the first spacer sleeve step part are connected in interference fit, the sealing ring is tightly pressed in the sealing groove by the first cover plate step part.

14. The formation method for liquid rubber composite nodes with the tubular flow channel according to claim 1, wherein when the middle spacer sleeve adopts the multi-disc spacer sleeve, before assembly, a gap is reserved between end surfaces of two close ends of adjacent disc bodies; and after assembly, the gap disappears and the end surfaces of two close ends of adjacent disc bodies come into contact with each other; before assembly, an open gap is also reserved in the rubber and at each gap; and after assembly, the open gap is filled with deformed rubber, such that the open gap disappears.

15. The formation method for liquid rubber composite nodes with the tubular flow channel according to claim 1, wherein when the middle spacer sleeve adopts the multi-disc spacer sleeve, by taking a center point of the middle spacer sleeve as a circle point, circle center angles corresponding to a plurality of arc disc bodies are unequal; and circle center angles corresponding to hollowed arc disc bodies are larger than circle center angles corresponding to non-hollowed arc valve bodies.

* * * * *